(12) United States Patent
Awad

(10) Patent No.: US 7,775,094 B2
(45) Date of Patent: Aug. 17, 2010

(54) APPARATUS AND METHOD FOR MEASURING TIRE THICKNESS

(76) Inventor: Adam Awad, 3539 Eva Jane, San Antonio, TX (US) 78261

( * ) Notice: Subject to any disclaimer, the term of this patent is extended or adjusted under 35 U.S.C. 154(b) by 593 days.

(21) Appl. No.: 11/653,757

(22) Filed: Jan. 16, 2007

(65) Prior Publication Data

US 2008/0168833 A1    Jul. 17, 2008

(51) Int. Cl.
*G01M 17/02* (2006.01)
(52) U.S. Cl. .................................... 73/146
(58) Field of Classification Search ........ 73/146–146.8; 340/442–447
See application file for complete search history.

(56) References Cited

U.S. PATENT DOCUMENTS

| | | | |
|---|---|---|---|
| 2,930,426 A | 3/1960 | Kiang et al. | |
| 6,725,713 B2 * | 4/2004 | Adamson et al. | 73/146.5 |
| 6,860,303 B2 * | 3/2005 | Rensel et al. | 152/152.1 |
| 6,959,592 B2 * | 11/2005 | Caretta | 73/146 |
| 6,967,590 B2 * | 11/2005 | Mancosu et al. | 340/870.07 |
| 7,051,584 B2 * | 5/2006 | Robert et al. | 73/146 |
| 7,076,998 B2 * | 7/2006 | Bulst et al. | 73/146 |
| 7,095,311 B2 | 8/2006 | Coates et al. | |
| 7,119,896 B2 | 10/2006 | Godeau et al. | |
| 7,138,911 B2 * | 11/2006 | Tyndall | 340/447 |
| 7,183,937 B2 * | 2/2007 | Park et al. | 340/693.1 |
| 7,280,036 B2 * | 10/2007 | Kafrawy | 340/438 |
| 7,411,487 B2 * | 8/2008 | Takao et al. | 340/442 |
| 7,509,834 B2 * | 3/2009 | Bauchot et al. | 73/8 |
| 2005/0237170 A1 | 10/2005 | Wilson et al. | |
| 2005/0242935 A1 | 11/2005 | Kafrawy | |
| 2006/0124214 A1 | 6/2006 | Bauchot et al. | |
| 2006/0208902 A1 | 9/2006 | Brey | |

OTHER PUBLICATIONS

Fowler, Kenneth A., et al.; Theory and Application of Precision Ultrasonic Thickness Gaging; 'Insight'—The Journal of the British Institute of NDT; Oct. 1997, vol. 2; No. 10.

* cited by examiner

*Primary Examiner*—Lisa M Caputo
*Assistant Examiner*—Jermaine Jenkins
(74) *Attorney, Agent, or Firm*—Michael D. Paul; Gunn, Lee & Cave, P.C.

(57) ABSTRACT

A reusable patch adhesively bondable to the inside of a tire. Disposed within the patch is at least one sensor that generates a radially outwardly directed signal and senses a reflection thereof from the tire's outer surface. Circuitry means is connected to the receiver for receiving data representative of the original and reflected signal and calculating a distance measurement representative of the distance between the sensor and the reflection point. Communication means then transmits the appropriate data to indication means, which triggers an indicator to alert the driver of a tire failure or potential tire failure.

13 Claims, 4 Drawing Sheets

APPARATUS AND METHOD FOR MEASURING TIRE THICKNESS

CROSS REFERENCE TO RELATED APPLICATIONS

Not applicable.

BACKGROUND OF THE INVENTION

1. Field of the Invention

The present invention relates generally to measuring a tire's thickness from within the tire, including thickness of aircraft tires, commercial trucking tires, and tires used in the consumer automotive industry as well as racing. More specifically, the invention relates to an apparatus that is securable to the inside of a tire and a corresponding method for measuring tire thickness, thus allowing for the operator of a vehicle to be alerted about an eminent failure of or the need to replace a failing or failed tire.

2. Description of Related Art

A tire's tread serves to improve contact between the tire and road in wet conditions. Without the grooves of the tread, water on the road surface would be trapped under the tire and cause a loss of friction resulting in hydroplaning. This is an extremely dangerous occurrence wherein braking, cornering, or abruptly accelerating the vehicle can result in loss of control with potentially fatal results. The tread provides a route for the water to escape from under the tire and allows the tire to more effectively grip the road.

For those applications where treaded tires are used, proper tread depth is important to safely operating the vehicle, but over time the tread wears with increased usage and the tire must eventually be replaced. Failure to timely replace a worn tire can result in a tire blowout, which at high speeds may lead to significant loss of control. Most modern road tires have built-in tread wear indicators in the form of small blocks of rubber molded into the bottoms of the grooves of the tread. When the tread has worn down to where the tops of these blocks are level with the top of the tread, the tire needs to be replaced. Alternatively, a tire tread depth gauge could be used to measure the depth of the remaining tread. Both of these methods require the operator to visually inspect the tire, which is a duty that may be neglected.

But because tire tread reduces the grip on the road by reducing the contact area between the rubber and driving surface, motor racing vehicles such as stock racing cars, open-wheeled racing cars, and dragsters frequently use treadless tires, or "slicks," to create the greatest amount of friction between the tire and the track. This allows the driver to maintain greater control at high speeds.

For those applications that use treadless tires, such as racing, the thickness of the tire material is equally important as it is for treaded tires. If the tire abnormally wears, or wears regularly but more quickly than expected, the life of the vehicle operator as well as other participants and spectators could be placed in jeopardy due to a tire failure. Accordingly, an apparatus that can measure tire thickness in various applications would aid in preventing blowouts and other tire failures, as well as increase the efficiency and reliability of performing timely maintenance on the tires.

Numerous patents and applications have addressed devices and methods for measuring tread depth. For example, U.S. Published Application 2005/0242935 (the '935 application) presents a detection and warning system wherein a conductive element is embedded in the tire tread at a predetermined level. When the tire is worn to the predetermined level of the conductive element, the conductive element breaks, and the open circuit is detected by a logic element electrically connected to the conductive element. The driver is then alerted to the need for replacing the tire.

Similarly, U.S. Pat. No. 7,095,311 (the '311 patent) presents a coding apparatus that uses a modulated reflectance technology to measure tire tread depth. By placing a thin wire loop into the tire tread at a predetermined level, the loop will be broken when the tread is worn to that level. The broken loop changes the electromagnetic response of the loop, and appropriate circuitry detects the change in frequency response and interprets that change as a certain amount of tread wear.

U.S. Pat. No. 7,119,896 (the '896 patent) also provides a method and system for measuring wear on a tire. The '896 patent discloses a system wherein electromagnetic energy is transmitted into the tire's internal space through a transmission element disposed in the tread. The length of the transmission element changes as the tire tread wears. The amount of energy transmitted into the tire's internal space is a function of the length of the transmission element. The tire tread thickness can then be determined by analyzing the amount of energy that has propagated into the tire's internal space.

U.S. Published Application 2006/0208902 (the '902 application) presents a system wherein at least one radio frequency identification (RF ID) tag is embedded in the tread of a tire. So long as the RF ID tag remains embedded within the tread, an associated RF tag reader located within the tire's inner space detects its presence and can determine that the tread is at least not worn to the known level of the RF ID tag. As the tread wears to the level of the RF ID tag, the RF ID tag is exposed and discarded from the tire and moves outside of the range of the RF tag reader. If the RF tag reader fails to detect an RF ID tag, the system knows that the tire has worn to at least the level of the missing RF ID tag.

Among other disadvantages, each of the aforementioned systems is destroyed or otherwise modified during normal operation such that it cannot be reused. For example, the conductive element of the '935 application cannot be "unbroken"; the wire loop of the '311 patent is permanently broken and cannot be reused. Similarly, the embedded transmission element of the '896 patent cannot be lengthened and reinstalled in another tire, nor can the RF ID tag of the '902 application be recovered and reinserted into a different tire. Moreover, each of the systems disclosed by these applications and patents would have limited use in treadless applications, such as tires used in motor racing, because they are specifically contemplated for use in the tire's tread. Accordingly, a need exists for a reusable apparatus for measuring tire thickness that can be removed from a worn tire and re-installed on a new tire, regardless of whether the tire is treaded or slick.

SUMMARY OF THE INVENTION

The present invention discloses an apparatus and method for measuring tire thickness, and is applicable to all tires, including those used in aircrafts, automobiles, commercial trucking, and racing. The invention comprises a patch securable to a tire inner wall. At least one sensor is disposed within the patch for generating a signal directed radially outwardly from the tire and then sensing a reflection of the signal. Circuitry means electrically connected to the sensor receives a representation of the reflected signal and generates data representative of a distance measurement between the sensor and the reflection point; thus, the data represents the distance between the sensor and the outer surface of the tire. Communication means then accepts the data from the circuitry means and communicates the data to a predetermined location, which is preferably inside the passenger cabin of a corresponding vehicle.

In the preferred embodiment of the present invention, the patch is reusable and programmable/adjustable for the appropriate thickness of the tire to be gauged. Other aspects of the invention include indication means for receiving the data from the communication means and presenting the data in a form from which the amount of current tire thickness may be determined. By comparing the measured tire thickness to the original tire thickness, the amount of wear on the tire and tire material remaining may be calculated, and tire safety characteristics determined.

Yet another aspect of the invention is a tab positioned at the perimeter of the patch for aiding with the removal of the patch from the tire inner wall. After removal, the patch may be re-installed on another tire for use. Moreover, multiple patches may be installed within a single tire to provide additional measurements of the thickness of the tire. The invention further provides for audible as well as visual indication of a potential tire failure.

BRIEF DESCRIPTION OF THE SEVERAL VIEWS OF THE DRAWINGS

The present invention, as well as further objects and features thereof, is more clearly and fully set forth in the following description of the preferred embodiment, which should be read with reference to the accompanying drawings, wherein.

DETAILED DESCRIPTION OF THE INVENTION

Figure 1:
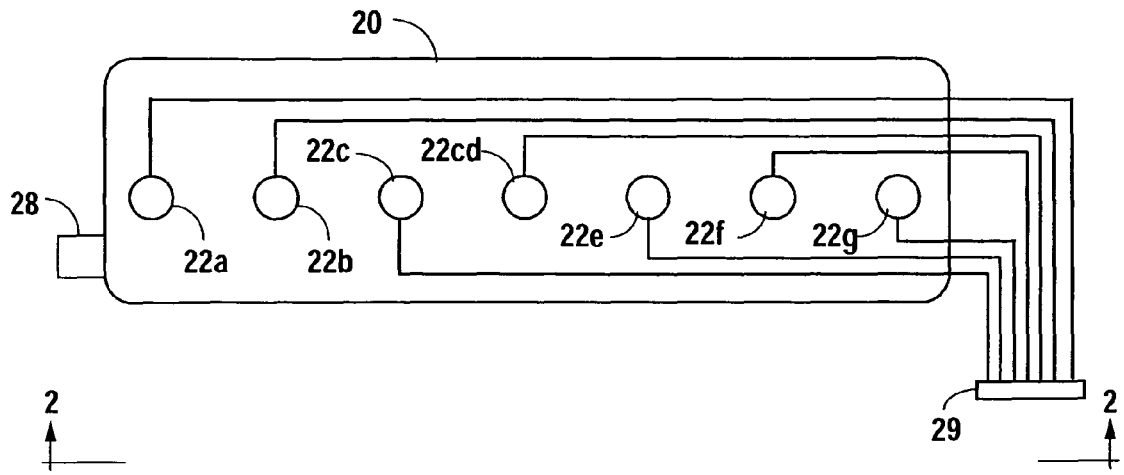
FIG. 1 is an elevation of the patch of the present invention.
Figure 2:
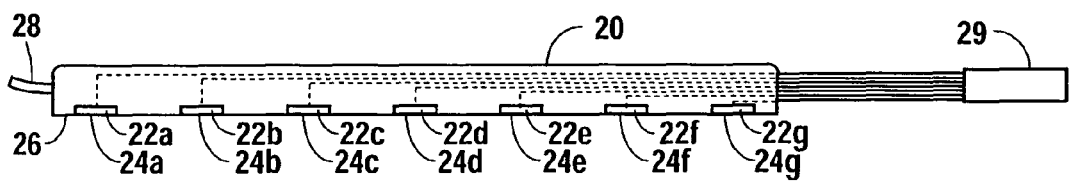
FIG. 2 discloses a side elevation of the patch along section line 2-2 of FIG. 1.

As shown in FIG. 1 and FIG. 2, the present invention comprises a patch 20 securable to the inner wall of a tire and that is preferably rubber or a combination of different rubbers that facilitate bonding to the inner wall, but in any event the patch 20 is bondable to an inner wall of a tire with an adhesive. Within the patch 20 is disposed a plurality of sensors 22a-22g, each of which has an emitting side 24a-24g oriented toward a bonding surface 26 of the patch 20. The emitting side 24a-24g of each sensor 22a-22g is preferably flush with the bonding surface 26 such that the emitting sides 24a-24g contact the inner wall of the tire. Each of the sensors 22a-22g is electrically connected to a wiring harness 29 that allows for further electrical connection to other components of the invention. The bonding surface 26 of the patch 20 is coatable with the adhesive (not shown), which is distributed over the bonding surface 26 so as not to interfere with the emitting sides 24a-24g of the sensors 22a-22g and disrupt distance measurements. A tab 28 positioned at the perimeter of the patch 20 provides an easily grippable location by which one may remove the patch 20 from the inside wall of the tire by gently peeling the patch 20 away from the adhesive.

The sensors 22a-22g described herein are known in the prior art, such as those used for ultrasonic nondestructive testing (NDT). Ultrasonic testing, wherein materials are characterized by means of high-frequency sound waves, is extensively used for quality control applications. In thickness gauging, ultrasonic techniques permit quick and reliable measurement of thickness without requiring access to both sides of a part, which is in this case a tire. Ultrasonic thickness gauges usually operate at frequencies between 500 kHz and 100 MHz using piezoelectric transducers to generate bursts of sound waves when excited by electrical pulses. A pulse-echo ultrasonic thickness gauge determines the thickness of a part or structure by accurately measuring the time required for a short ultrasonic pulse generated by a sensor to travel through the thickness of the material, reflect from the back surface, and be returned to the sensor. In most applications this time interval is only a few microseconds or less. The result is expressed in the relationship:

$$d=Vt/2,$$

where
d=the thickness of the tire,
V=the velocity of sound waves in the tire, and
t=the measured round-trip transit time.

Thus, because V is known (or measurable for a tire), d is readily calculable. See Kenneth A. Fowler, et al., Theory and Application of Precision Ultrasonic Thickness Gaging, which is incorporated herein by reference.

Figure 3:
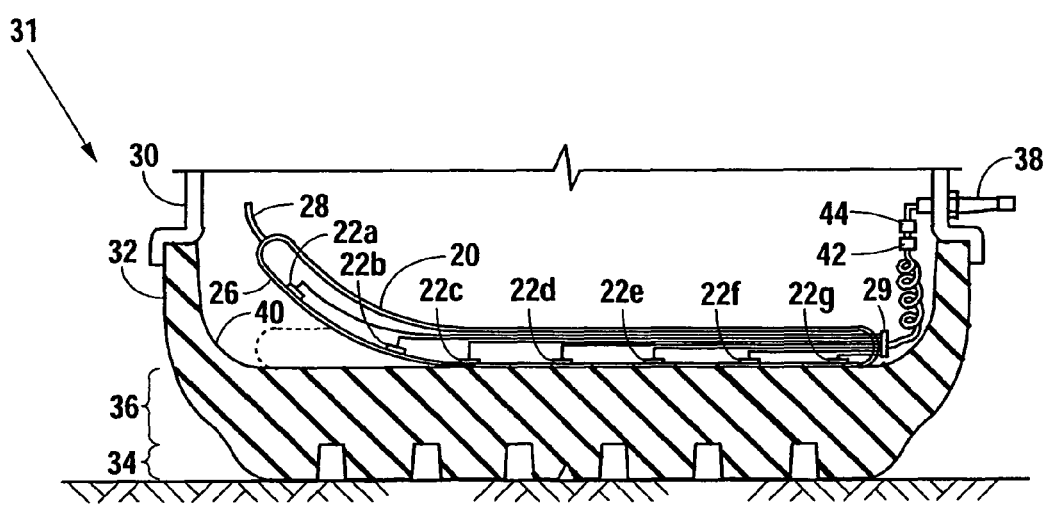
FIG. 3 shows the apparatus disposed within the inner space of a tire.

FIG. 3 is a partial sectional view of a wheel assembly 31 having a rim 30, a tire 32, and a tube (not shown for simplicity). The tire 32 comprises a tread area 34 and a tread base 36. A valve stem 38 connected to the tube protrudes through the rim 30 to provide a path for tube inflation. Prior to affixing the tire 32 to the rim, the patch 20 is secured to the tire 32 by removing a protective film (not shown) from the bonding surface 26 to expose the pre-applied adhesive (not shown), and then pressing the patch 20 firmly onto the inside inner wall 40 of the tire 32. Appropriate adhesives, or rubber bonding agents, are known and readily available. Alternatively, the adhesive may be first applied to the inside inner wall 40 of the tire and the patch 20 then directly pressed thereon. The wiring harness 29 is electrically connected to circuitry means 42 for receiving a representation of the time difference between the generated signal and the reflected signal from the sensors 22a-22g and providing the resulting distance data to a transmitter 44, which uses the valve stem 38 as an antenna to transmit data to the passenger compartment of the vehicle. U.S. Published Application 2005/0237170 teaches alternative methodologies wherein an antenna is mounted to a tire sidewall, and the present invention may be similarly configured. Alternatively, the antenna may be any variety of suitable antennas such as a wire, a bar, a plate, or the like.

Figure 4:
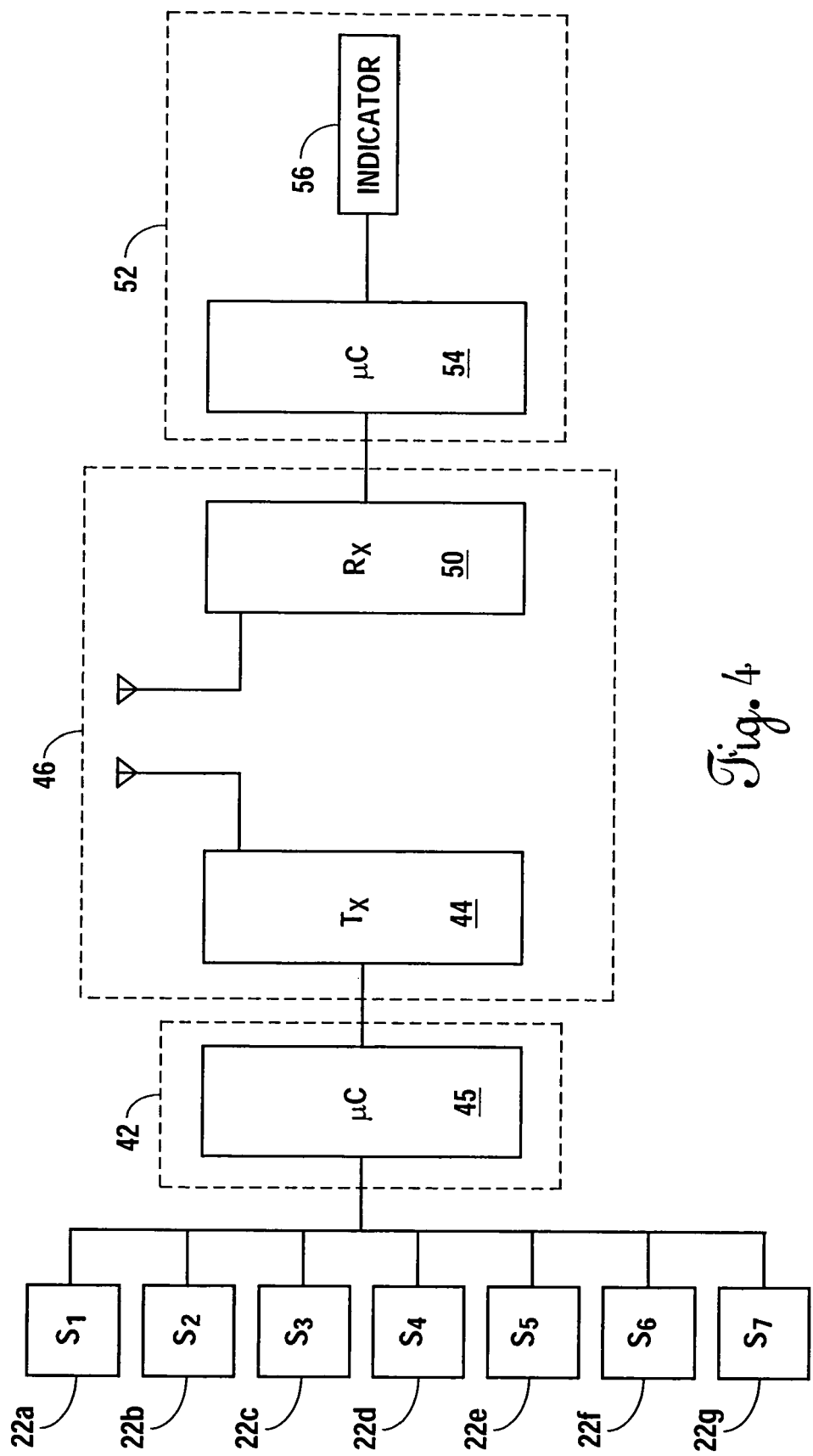
FIG. 4 is a block diagram of the preferred embodiment of present invention.

FIG. 4 depicts a block diagram showing the functional operation of the preferred embodiment. The plurality of sensors 22a-22g is electrically connected to circuitry means 42 comprising a first microcontroller 45, which analyses the representations transmitted from the sensors 22a-22g according to a predefined program. The predefined program selects the minimum distance measurement during any given tire rotation and calculates the tire thickness based on that measurement as described hereinbelow. The tire thickness information is then provided to communication means 46 comprising a wireless transmitter 44 and wireless receiver 50 located remotely and preferably within the passenger compartment of the vehicle. After the tire thickness information is received, the data is transmitted to indication means 52 comprising a second microcontroller 54 and an indicator 56. While the preferred embodiment utilizes wireless technology to convey the data to the indication means 52, hardwired technology may also be used wherein a transmitter is coupled to a receiver using a conductive element.

It should further be noted that a number of combinations of these same components may perform the same tasks, which is evident to one having ordinary skill in the electronic arts. For example, the first microcontroller 45 might not perform any analysis of the sensor representations to determine tire thickness, but might simply transmit (and manage the transmission of) the sensor representations to the indication means 52 via the communication means 46, which may perform the required analysis. Similarly, the indicator 56 of the preferred embodiment is visual (see FIG. 8), although an auditory indicator may also be used.

Moreover, while a first microcontroller 45 is used in the preferred embodiment, many alternatives exist, such as programmable logic chips or microprocessors, that may also be used depending on specific application needs. For example, while a single microcontroller may be sufficient to handle data from a single patch 20 comprising of a plurality of sensors 22a-22g, a microprocessor may be used for the increased processing requirements of a plurality of patches secured to a single tire.

Figure 5:
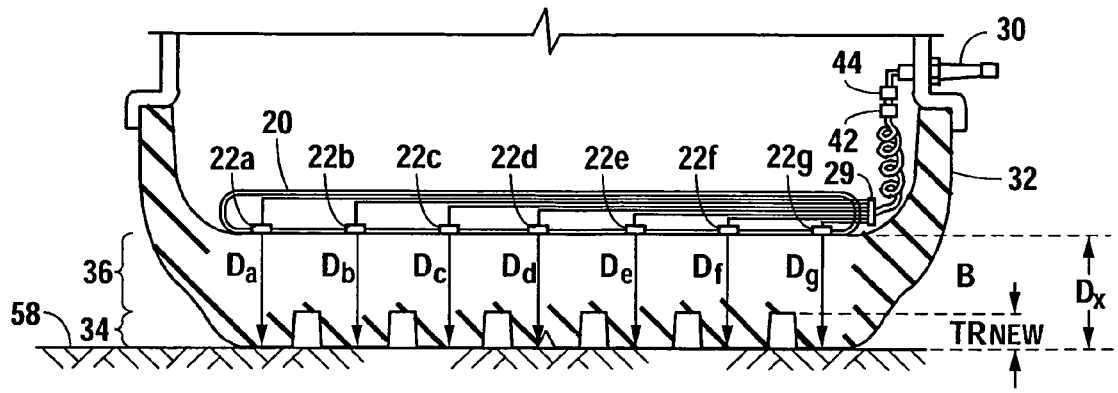
FIG. 5 and FIG. 6 illustrate the present invention installed in the inner space of a new tire and a worn tire, respectively.
Figure 6:
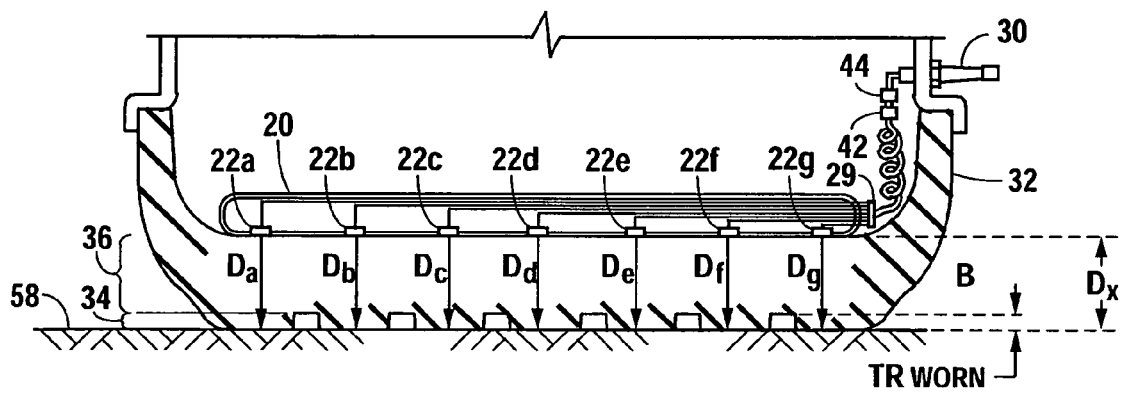

As shown in FIG. 5 and FIG. 6, each of the sensors 22a-22g continuously generates a signal directed radially outwardly from the tire 32 and senses a reflection of the signal to determine a distance $D_x$ to the outer surface of the tire 32. As used herein, $D_x$ represents a distance measurement from sensors 22a-22g. Thus, $D_a$ corresponds to a distance measurement to the outer surface of the tire 32—the surface that normally contacts the road—from one sensor 22a. Similarly, $D_g$ represents a distance measurement from a sensor 22g. Each of the sensors 22a-22g generates a signal and senses a reflected signal from which the distance to the tire 32 outer surface may be determined. Each of the sensors 22a-22g then provides representations of a distance measurement ($D_a$ through $D_g$) to the circuitry means 42, which in the preferred embodiment includes a first microcontroller 45 (see FIG. 4) that analyzes the data as it is received from the sensors 22a-22g. "Continuously" as used herein means without interruption or at some predetermined interval. For example, the data provision may occur once every millisecond, once every ten milliseconds, or at some other predetermined interval sufficient to accurately measure the distance between the emitting sides 24a-24g (see FIG. 2) of the sensors 22a-22g and the outer surface of the tire 32.

More specifically, FIG. 5 particularly illustrates the present invention in operation on a new tire 32 having a tire base 36 of thickness B and an initial tread area 34 of thickness $TR_{new}$. Similarly, FIG. 6 illustrates the present invention in operation with the same tire base 36 of thickness B and a worn tread area 34 of thickness $TR_{worn}$. Each of the sensors 22a-22g will determine a corresponding distance $D_a$ through $D_g$ approximately equal to $TR_{worn}$ plus B. In some applications, greater emphasis may be placed on distance measurements from the two sensors 22a, 22g positioned closest to the sidewalls of the tire 32, which may be more vulnerable to blowouts.

While the sensors 22a-22g may be spaced across the width of the inner wall 40 of the tire 32 (see FIG. 5 and FIG. 6), the microprocessor, power supply, transmitter and all other components composing the system may be situated anywhere within the tire, including on the sensor patch 20 or on a separate patch adhering to the sidewall of the tire 32.

It should further be noted that only a certain percentage of the tire's 32 thickness may be worn prior to needing to replace the tire 32. For example, in FIG. 5 and FIG. 6 above, the simplest model would be to assume that the usable portion of the tire's thickness is equal to the tread thickness. In that case, when the tread thickness TR equals zero, the tire 32 has no more usable thickness—because the tire 32 has no more tread—and the tire 32 must be replaced as the remaining tire material would compose only the base B of the tire 32. In reality, however, not even the entire tread thickness may be worn before the tire 32 needs replacing, but only a portion of the tread may be worn.

When considering treadless or "slick" tires, again only a portion of the tire thickness is usable. For example, if a new tire's thickness is one inch, perhaps only a half inch may be worn before the tire needs replacing. Thus, a tire thickness of three quarters of an inch represents a tire with fifty percent of its usable thickness depleted. These numbers are exemplary and highly dependent on individual tire characteristics and applications needs. For example, a commercial trucking tire will be much larger (and thicker) than a tire designed for a compact consumer automobile. Similarly, the characteristics (and safety parameters) of an aircraft tire will be much different than those of a stock racing car or a dragster.

Figure 7:
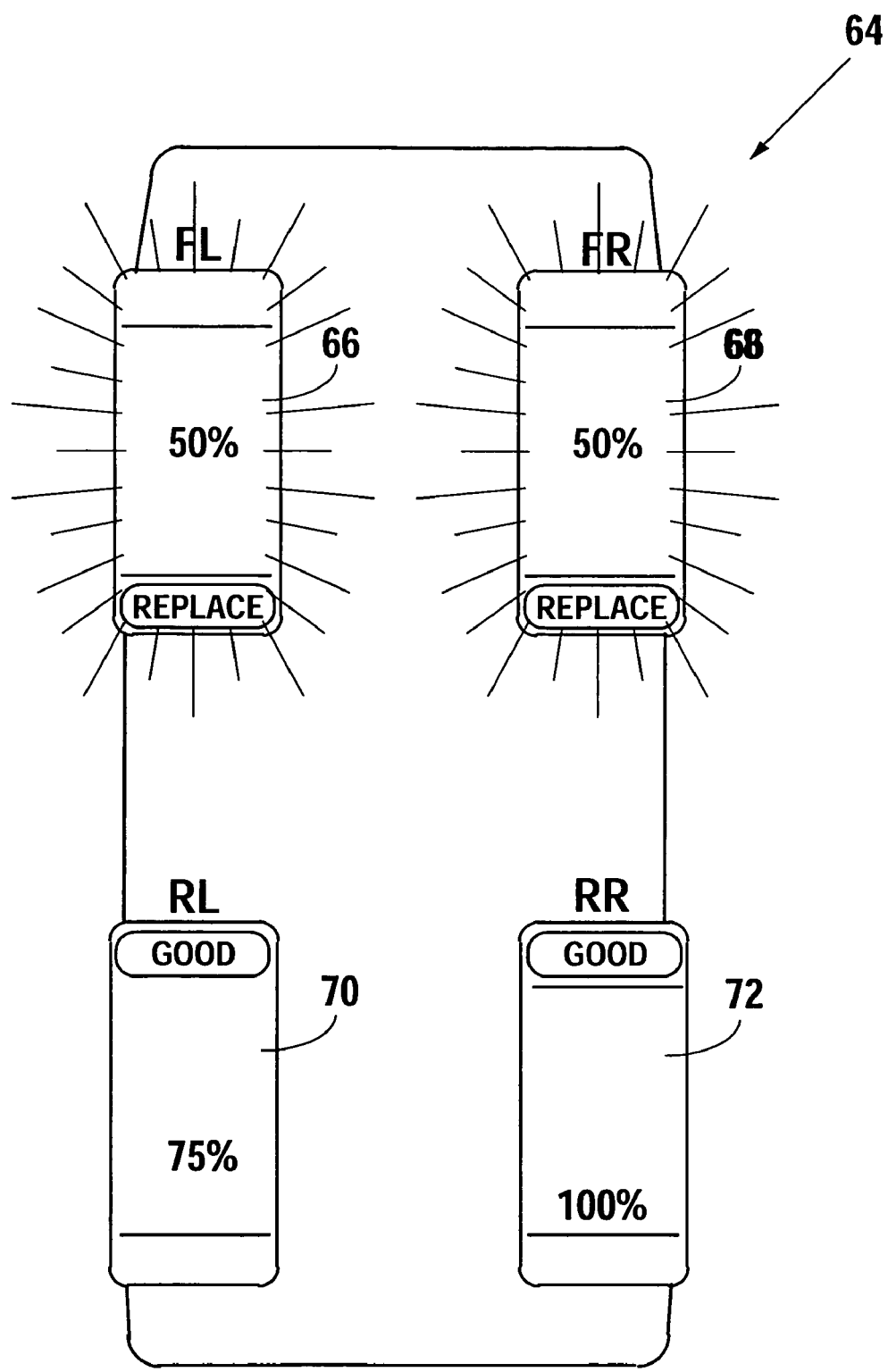
FIG. 7 is a representation of four preferred indicators of the invention.

FIG. 7 depicts an exemplary dashboard display configuration 64 comprising a first indicator 66, second indicator 68, third indicator 70, and fourth indicator 72, each of which corresponds to a tire on a typical four-wheeled vehicle. The first indicator 66, designated "FL" (meaning "front left"), and the second indicator 68, designated "FR" (meaning "front right") represent that the corresponding tires have fifty percent of their usable thickness remaining. The first indicator 66 and second indicator 68 further advise that the tire should be replaced by illuminating the word "Replace," and flashing to draw the driver's attention to the indicators 66, 68. The third indicator 70 and fourth indicator 72 correspond to the rear left and rear right tires of the vehicle respectively. The third indicator 70 indicates that seventy-five percent of the tire's usable thickness remains, and that the tire condition is "Good." Similarly, the fourth indicator 72 indicates that one-hundred percent of the tire's usable thickness remains—in other words, the corresponding tire is for all intents and purposes new—and that the tire condition is "Good."

It should be noted that the indicator of the present invention is not limited to any particular form or increment of measure. The apparatus is capable of measuring very small increments of tire thickness, and the usable thickness remaining could be represented in any form sufficient to convey the information to the vehicle operator. For example, in racing applications, the vehicle operator or maintainer may desire to monitor the tires' usable thickness to a degree of one percentage point, thus allowing more accurate measurement not only of usable thickness but of the rate of change of usable thickness. Moreover, in alternative embodiments, these indicators 66, 68, 70, 72 could also comprise an audible warning chime to alert the driver or maintainer that a tire needs repair or replacement. The indicators 66, 68, 70, 72 may be made from any of the standard types of dashboard display technologies, including LEDs, liquid crystal displays, dials, and gauges. In alternative embodiments, the indicators 66, 68, 70, 72 may be auditory, or some combination of an auditory indicator with a visual indicator.

It should further be noted that, prior to operation, the apparatus must either be calibrated for the specific tire characteristics (i.e., tire thickness, tire base, tread depth, etc.) or the known tire characteristics programmed into the circuitry means 42 (see FIGS. 4, 5, and 6). This may be done by performing a calibration procedure that is part of the predefined program when the apparatus is installed or by altering the predefined program to account for the values of these characteristics.

The present invention is described above in terms of a preferred illustrative embodiment of a specifically described apparatus and method for measuring tire thickness, as well as alternative embodiments of the present invention. Those skilled in the art will recognize that alternative constructions of such an apparatus can be used in carrying out the present invention. For example, while the present invention is described specifically in FIG. 5 and FIG. 6 with regard to a preferred embodiment that measures tire thickness of a treaded tire, the invention is equally adept at measuring tire thickness of racing, or "slick," tires, as described herein. Other aspects, features, and advantages of the present invention may be obtained from a study of this disclosure and the drawings, along with the appended claims.

I claim:

1. An apparatus for measuring tire thickness comprising:
a patch having a bonding surface securable to a tire inner wall;
at least one range sensor disposed within said patch for generating a signal directed radially outwardly from the tire and sensing a reflection of said signal from an outer surface of said tire, said at least one range sensor having an emitting side substantially flush with said bonding surface;
circuitry means electrically connected to said at least one range sensor for receiving a representation of the time difference between the generated signal and the reflected signal and for generating data representative of said time difference; and
communication means for accepting said data from said circuitry means and communicating said data to a predetermined location.

2. The apparatus of claim 1 further comprising indication means for receiving said data from said communication means and presenting said data in a form representative of said tire thickness.

3. The apparatus of claim 1 further comprising a manually-grippable tab positioned at the perimeter of said patch for aiding with the removal of said patch from said tire inner wall.

4. The apparatus of claim 1 wherein said patch is adhesively securable to said tire inner wall.

5. The apparatus of claim 1 wherein said communication means comprises a transmitter and a receiver.

6. The apparatus of claim 5 wherein said transmitter is electrically connected to said circuitry means and said receiver is electrically connected to said indication means.

7. The apparatus of claim 5 wherein said transmitter and said receiver are wireless.

8. A method for measuring tire thickness comprising:
providing a system comprising
a patch having a bonding surface securable to a tire inner wall;
at least one range sensor disposed within said patch for generating a signal directed radially outwardly from said tire and sensing a reflection of said signal from an outer surface of said tire, said at least one range sensor having an emitting side substantially flush with said bonding surface;
circuitry means electrically connected to said at least one range sensor for receiving a representation of the time difference between the generated signal and the reflected signal and for generating data representative of said time difference; and
communication means for accepting said data from said circuitry means and communicating said data to a predetermined location;
generating a signal from inside said tire at a position substantially flush with an inner surface, said signal directed radially outwardly from said tire;
sensing a reflection of said signal from said outer surface of said tire; and
generating data representative of said time difference between said signal and said reflected signal.

9. The method of claim 8 further comprising:
transmitting said data to a receiver; and
presenting said data in a form representative of said tire thickness.

10. The method of claim 9 further comprising indicating said tire thickness.

11. The method of claim 9 further comprising indicating usable tire thickness.

12. The method of claim 9 further comprising indicating a potential tire failure.

13. The method of claim 9 further comprising indicating a tire failure.

* * * * *